March 5, 1935.  R. BELFORD  1,993,314
GATHERING DEVICE
Filed Feb. 2, 1934  2 Sheets-Sheet 1
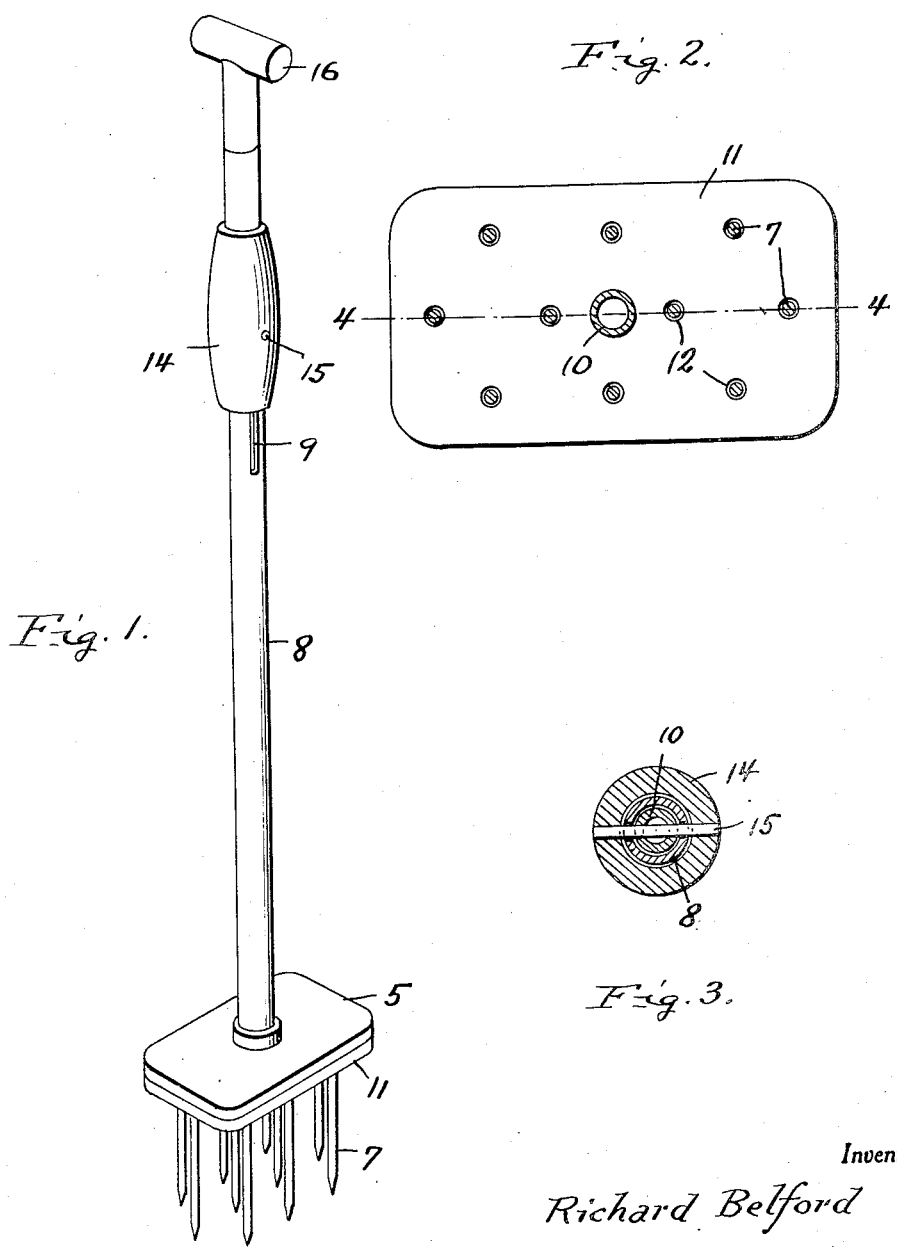
Inventor
Richard Belford
By Clarence A. O'Brien
Attorney March 5, 1935.  R. BELFORD  1,993,314
GATHERING DEVICE
Filed Feb. 2, 1934   2 Sheets-Sheet 2
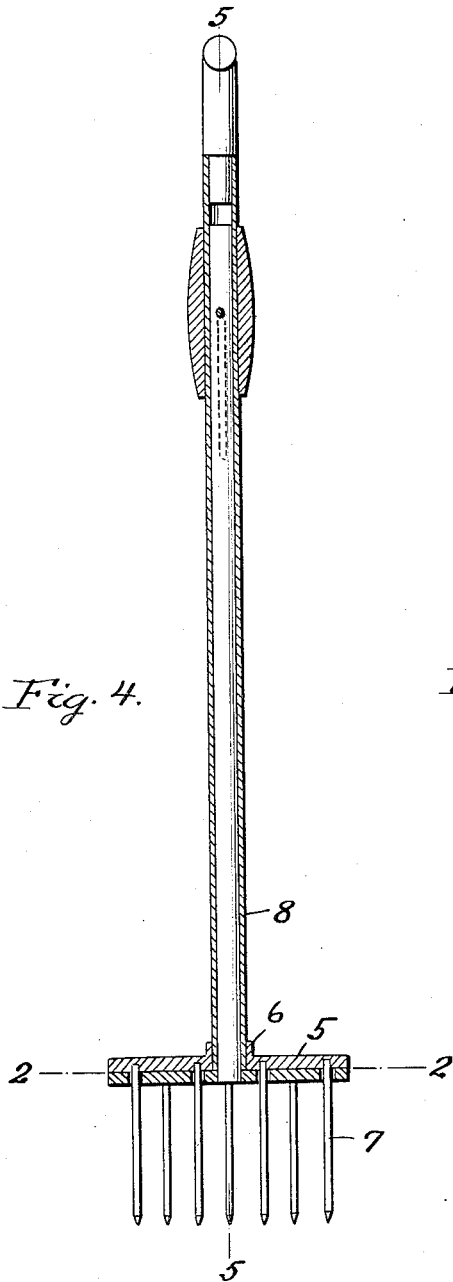
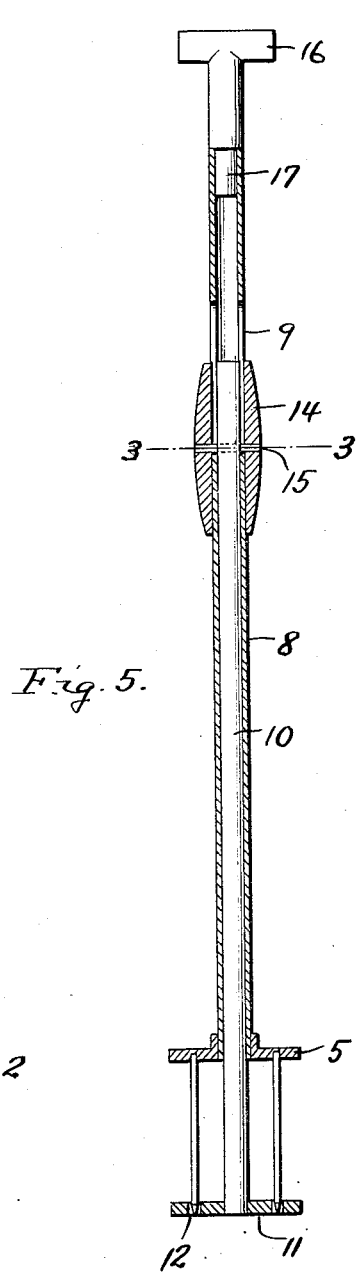
Inventor
Richard Belford
By Clarence A. O'Brien
Attorney Patented Mar. 5, 1935

1,993,314

UNITED STATES PATENT OFFICE 1,993,314

GATHERING DEVICE

Richard Belford, Lenox, Mass.

Application February 2, 1934, Serial No. 709,536

1 Claim. (Cl. 294—61)

The present invention relates to gathering devices and more particularly to that class of devices used for gathering leaves, refuse and the like.

The object of the invention resides in the provision of a gathering device of this nature which is exceedingly simple in construction, easy to operate, inexpensive to manufacture, strong and durable, handy, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a perspective view of the device emobdying the features of my invention.

Figure 2 is a horizontal section through the device taken substantially on the line 2—2 of Figure 4.

Figure 3 is a detail section taken substantially on the line 3—3 of Figure 5.

Figure 4 is a longitudinal vertical section taken substantially on the line 4—4 of Figure 2.

Figure 5 is a similar section taken substantially on the line 5—5 of Figure 4.

Referring to the drawings in detail it will be seen that the numeral 5 denotes a substantially rectangular plate having a central opening and a central collar 6 rising in registry with the opening. A plurality of pins 7 have their upper ends fixed in the plate 5 and depend downwardly therefrom in spaced coextensive parallelism. A hollow shank 8 fits in the central opening of the plate 5 and its collar 6 and rises perpendicularly from the plate. Adjacent the upper end of this hollow shank it is provided with a pair of longitudinally extending coextensive opposed slots 9. A stem 10 is slidable in the shank. On the lower end of this stem 10 is a substantially rectangular plate 11 having a central opening in which the lower end of the stem is fixed. This plate 11 has a plurality of spaced openings 12 one for each pin 7. A sleeve 14 is slidable on the shank 8 and has a pin 15 extending through the slots 9 and through an opening in the upper portion of the stem 10. Obviously by moving the sleeve up and down the plate 11 is moved toward or away from the plate 5. A T-shaped handle 16 has a reduced end 17 fixed in the upper end of the hollow shank 8.

With the device having its parts as shown in Figure 4 it will be seen that the operator manipulates the same to force the prongs or pins 7 through the leaf or refuse to be picked up. Then by placing the device over the collecting receptacle the sleeve 14 is moved so that the parts assume the position shown in Figure 5 thereby forcing the leaf or refuse off of the prongs 7.

It is thought that the construction, operation, utility and advantages of this invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A gathering device comprising a plate having a central opening, a plurality of pins having their upper ends fixed in the plate, a hollow handle having its lower end fixed in the opening, a second plate located under the first plate and having a plurality of holes therein, one for each pin, a stem connected to the central part of the second plate and projecting into the hollow handle to a point adjacent the upper end of said handle, said hollow handle having a pair of oppositely arranged longitudinally extending slots therein, a sleeve encircling the slotted part of the handle adjacent the upper end of the handle and a pin passing through the sleeve, through the slots and through the upper portion of the stem, whereby movement of the sleeve will raise and lower the stem and the second plate, the distance between the pin which connects the stem to the sleeve and the second plate being such that when the pin is engaging the lower ends of the slots, the second plate is in a position with the lower ends of the gathering pins located in the opening in said plate.

RICHARD BELFORD.